United States Patent [19]
Ohnishi

[11] 4,143,403
[45] Mar. 6, 1979

[54] LIGHT BEAM SCANNING SYSTEM
[75] Inventor: Masahiro Ohnishi, Sayama, Japan
[73] Assignee: Fuji Photo Film Co., Ltd., Minami-ashigara, Japan
[21] Appl. No.: 775,588
[22] Filed: Mar. 8, 1977
[30] Foreign Application Priority Data
Mar. 8, 1976 [JP] Japan .................................. 51-24786
[51] Int. Cl.² .............................................. H04N 5/84
[52] U.S. Cl. ................................... 358/206; 358/208; 358/285; 358/293
[58] Field of Search ................... 350/7; 358/293, 285, 358/302, 208, 206, 132
[56] References Cited
U.S. PATENT DOCUMENTS
3,686,437  8/1972  Leonard ............................... 358/160
3,999,010  12/1976  Oosaka ................................ 358/285

Primary Examiner—Robert L. Griffin
Assistant Examiner—Edward L. Coles
Attorney, Agent, or Firm—Fleit & Jacobson

[57] ABSTRACT

Scanning lines are formed by deflecting a light beam with a rotating multi-face mirror. A light detecting means is placed within the field of deflected light at a position corresponding to the initial part of the scanning lines and the light beam deflected by each face of the rotating multi-face mirror is detected by the light detecting means causing it to produce a signal which is applied to a video clock pulse generator to stop its oscillation. When the light detecting means no longer detects the light beam it stops producing said signal and the video clock pulse generator begins producing clock pulses a short fixed time thereafter and in this manner the beginning points of the effective scanning lines are maintained in alignment regardless of angular imperfections in the rotating multi-face mirror or fluctuations in its speed of rotation.

8 Claims, 3 Drawing Figures

LIGHT BEAM SCANNING SYSTEM

BACKGROUND OF THE INVENTION

1. Field of the Invention

This invention relates to a light beam scanning system using a rotating multi-face mirror for application in a laser beam recording device, and more particularly to a light beam scanning system which is free from the jitter in the direction of the scanning lines which ordinarily occurs in a scanning system using a rotating multi-face mirror because of imprecision in manufacture (imprecision in the angle between adjacent mirror faces), fluctuations in the speed of rotation and mechanical vibration.

2. Description of the Prior Art

Numerous recording devices employing a laser beam as the scanning beam have been developed. In each of these an important role is played by the deflector used in the laser beam scanning system. Among the various types of known deflectors some employ an electro-optical or acoustical-optical effect while others employ a vibrating mirror in conjunction with a galvanometer or a rotating multi-face mirror. Systems employing a rotating multi-face mirror as the deflector are advantageous in that the angle of deflection is large, the resolution is high and spectral dispersion is nil. On the other hand, they are disadvantageous in that repeated scanning at precise intervals is difficult or impossible to attain since imprecisions in the rotating multiface mirror (mainly imprecision in the angles between adjacent mirror faces) and variations in the speed of rotation of the motor driving the multi-face mirror give rise to irregularities in the starting points of the scanning lines.

Take, for example, the problem arising from angular error between adjacent faces of the multi-face mirror. In a case where a mirror having 24 faces is used and 80% of the scanning line is taken as the effective scanning line, then if the effective scanning line is divided into 1500 dots, the angle of rotation of the multi-face mirror corresponding to a single dot will be: $360°/24 \times 0.8 \times 1/1500 = 0.008° = 28.8$ inches.

Thus an error in the angle between adjacent faces of the multi-face mirror of over 28.8 inches will cause the dots in adjacent scanning lines to be out of phase with each other by an interval corresponding to one or more dots. Where the image produced by scanning is required to have a high degree of resolution, the displacement among the scanning lines must be kept within a small fraction of a dot and an image formed by scanning lines having a displacement of as much as one dot can by no means be called satisfactory. This means, therefore, that the angular error between adjacent mirror faces must be kept within a few seconds.

Manufacture of a multi-face mirror possessing this degree of precision not only requires a high degree of skill but also is very expensive.

Let us next examine the effect of fluctuation in motor speed. If the same mirror having 24 faces is rotated at 3,600 rpm, the scanning frequency becomes 1.44 KHz and the scanning time per scanning line becomes 694.4 μs. As only 80% of the entire scanning line is used, the effective scanning time per line is 555.6 μs and the scanning time per dot is:

$$555.6 \ \mu s/1,500 \simeq 0.37 \ \mu s$$

As the rotating speed of the motor will not be subject to high frequency fluctuations of 1 KHz or more, the fluctuations which occur in the course of a single scanning line, that is, within 694.4 μs, can be ignored. However, when these fluctuations accumulate, they can amount to a large low frequency fluctuation on the order of several to several tens of Hz. Actual measurements show that this fluctuation gives rise to a time error of several μs or more as reckoned against an ideal constant speed of rotation. If the time required to scan the equivalent of a single dot is 0.37 μs, an error of this magnitude will result in a shift from the ideal image of ten to twenty dots or even more. As a consequence, it is nesessary to employ a high-performance motor controlled by a complex feed back system in order to hold the shift due to fluctuation in the speed of rotation of the motor to a small fraction of a dot.

As a system for eliminating jitter in the direction of scanning without improving the precision of the rotating multi-face mirror or the motor, the inventors previously proposed the invention described in their Japanese Patent application No. 120478/74. The system according to this previous invention applies to a laser beam recording device wherein the scanning lines are formed by deflecting the light beam by means of a rotating multi-face mirror the rotation of which is not synchronized with the video clock. A light detector is provided at a point within the scanning line immediately preceding the effective scanning line and the electrical signal obtained from the light detector is used as a synchronizing signal. Starting from the termination of this synchronizing signal, basic clock pulses having a frequency n (a positive integer) times that of the unsynchronized video clock are generated. The video clock pulses are obtained by dividing this signal by 1/n thus reducing jitter to as little as 1/n.

In such a system, if it should be desired to use a high-frequency video clock of a frequency of 10 MHz or more, the frequency of the basic clock would have to be 100 MHz. At such frequencies the system therefore becomes impractical since very few circuit elements are capable of responding to such frequencies.

SUMMARY OF THE INVENTION

In view of the foregoing observations and description of the known light beam scanning systems, the primary object of the present invention is to provide a light beam scanning system which employs a rotating multi-face mirror and is free from jitter.

Another object of the present invention is to provide a jitter free light beam scanning system which is capable of employing a video clock of very high frequency.

The above mentioned objects of the present invention are obtained by the present invention in the manner described below.

Scanning lines are formed by deflecting a light beam by means of a rotating multi-face mirror. A light detector is provided at point in the path of said beam corresponding to a point in the scanning lines near the beginning thereof. The light detector detects the beam deflected by each face of the multi-face mirror in turn and during the period that it detects the beam produces a generator disabling signal which is applied to the system's video clock pulse generator to stop the generation of clock pulses. A fixed time after the termination of the generator disabling signal, generation of video clock pulses is resumed.

Variation in the length of said "fixed time" must be kept small in comparison to the scanning time corresponding to a single dot and the error in the length of said "fixed time" should preferably be kept to one-tenth or less of the dot scanning time. By employing a generator which satisfies this time requirement it is possible to realize a jitter-free light beam scanning system.

Various other objects, features and advantages of the present invention will be more apparent by reference to the following detailed description of a preferred embodiment thereof taken in conjunction with the accompanying drawings as follows.

DESCRIPTION OF THE PREFERRED EMBODIMENT

Figure 1:
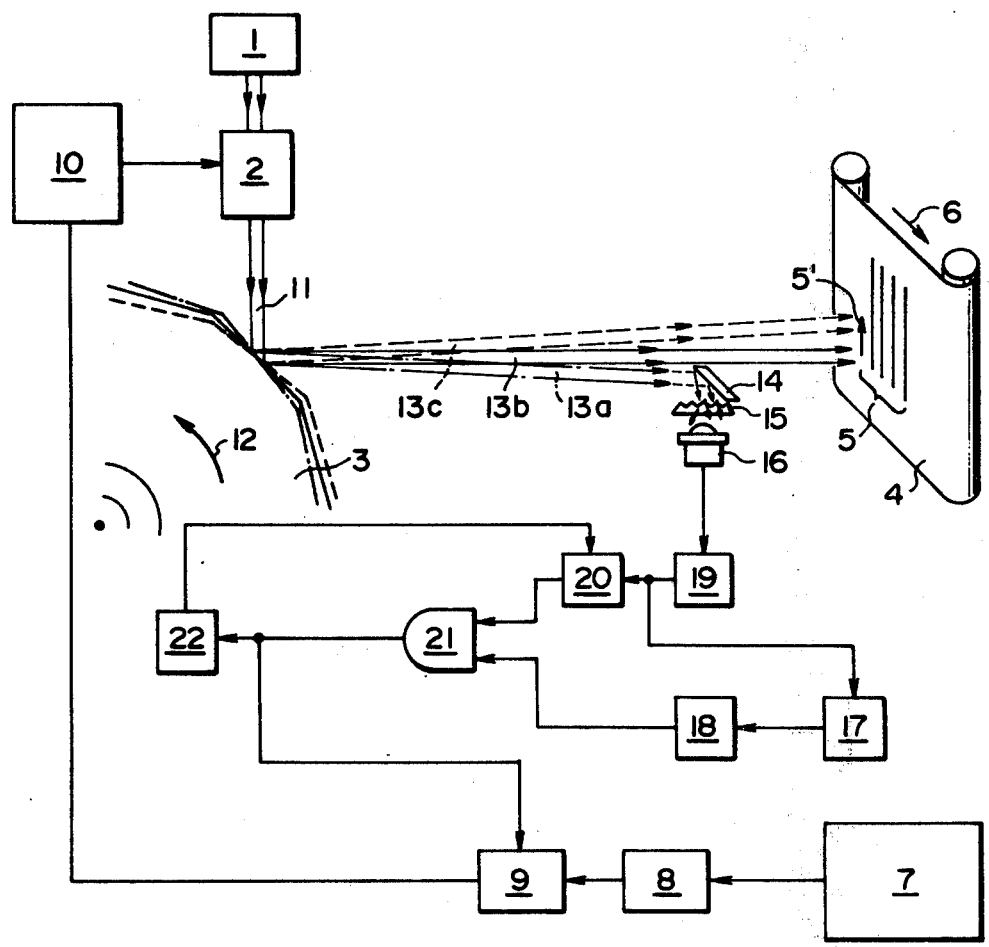
FIG. 1 is a schematic view of a data print-out device incorporating the present invention.

As seen in the schematic view of a computer data printout device embodying the present invention shown in FIG. 1, a laser beam is used to scan a photosensitive material to record data thereon in the form of a raster. The laser beam issuing from a laser 1 travels along the path indicated by arrows to a light modulator 2 where it is intensity modulated prior to being passed to a rotating mutli-face mirror 3 by which it is deflected in one direction so as to form scanning lines 5 on a light sensitive material 4. The light sensitive material 4 is continuously transported in the direction of arrow 6 so that the scanning lines stand side-by-side as shown in the drawing. As the light beam thus scans the light sensitive material in two directions, characters etc. corresponding to the output data from the associated computer are recorded thereon as dots on the scanning lines 5. Coded signals representing data from a data source 7 such as a computer, magnetic tape etc. are temporarily stored in a buffer memory 8 and are then read out from the buffer memory 8 at a speed different from the write-in speed and are applied to a character generator 9. The character generator 9 generates video signals upon receipt of clock pulses from a video clock to be described hereinafter. The video signals generated by the character generator 9 are sent to a driver 10 where they are amplified before being applied to the light modulator 2 to modulate the laser beam.

An explanation will now be given on how the scanning system of the present invention prevents jitter from arising in the direction of the scanning lines.

The laser beam 11 impinges from a given direction on the rotating mirror 3 as the mirror 3 rotates in the direction of the arrow 12 so that the reflected beam is progressively deflected along the paths indicated by 13a, 13b and 13c to scan the light sensitive material in the direction of the arrow 5'. A mirror 14 of raked configuration when seen from its edge as in FIG. 1 is fixed within the path of the deflected light beam at a position corresponding the initial part of the scanning lines 5 and this mirror 14 operates in conjunction with a diffusion plate 15 and a photoelectric element 16 to form a light detector. Laser light traveling along path 13a is reflected onto the diffusion plate 15 and reaches the photoelectric element 16, whereas laser light along paths 13b and 13c is not reflected but passes to the light sensitive material 4. Consequently, the initial section of the scanning line is cut off by the mirror 14 of the light detector so that the effective part of the scanning lines invariably begins from the same point on the light sensitive material 4. As this point is controlled solely by the position of the mirror 14 it is not affected by angular imperfections of the mirror or speed fluctuations of the motor. Thus, if the generation of video pulses is begun immediately or at a given fixed time after the deflected laser beam passes the light detector, no jitter in the direction of scanning will occur.

In the embodiment of this invention depicted in FIG. 1, the beam deflected by each face of the rotating multiface mirror 3 and detected by the light detector is one and the same beam as is used to record data. It is, however, also possible to use a totally different light beam. For example, the same effect can be obtained by directing a separate laser beam onto the face of the rotating mirror which is reflecting the data recording laser beam and detecting the reflected separate laser beam instead of the data recording laser beam. Furthermore, it is also possible to use, as the separate laser beam, the zero-order output beam obtained by an acousto-optical light deflector into which the data recording laser beam is put.

Next will be explained the method for generating video signals using the output of the light detector as the synchronizing signal. In FIG. 1, the block marked 17 is a video clock pulse generator which will be described later in conjunction with FIG. 2 and FIG. 3. Block 18 represents a shaping circuit for amplifying and shaping the clock pulses output by generator 17. Block 19 represents an amplifier for amplifying the output of the light detector. Block 20 is a flip-flop circuit designed to be switched over by the rising portion of the output wave from the amplifier 19 and to be reset when a counter 22 has counted a prescribed number of video clock pulses within the effective scanning line (the number of clock pulses being identical with the number of dots). In the embodiment of this invention being described, 150 characters each having a width of 10 dots and a height of 15 dots are recorded horizontally so that the counter 22 resets the flip-flop circuit 20 upon counting 1,500 video clock pulses. Block 21 represents an AND circuit which passes or blocks the video clock pulses from the shaping circuit 18 depending on the state of the output waveform of the flip-flop circuit 20. The video clock pulses passed by the AND circuit 21 are sent to the character generator 9 and the counter 22. As mentioned earlier, the counter 22 resets the flip-flop circuit 20 upon counting the prescribed number of video clock pulses.

Figure 2:
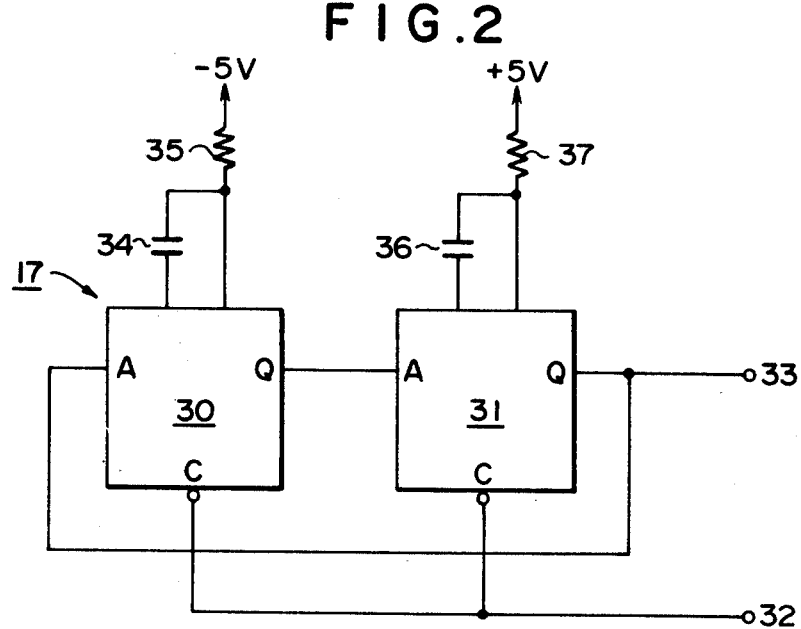
FIG. 2 and FIG. 3 are schematic views of video clock pulse generators usable in the present invention.

Now the construction and operation of the video clock pulse generator 17 will be described. FIG. 2 gives a schematic representation of one example of a video clock pulse generator for use in the system according to the present invention. In FIG. 2, blocks 30 and 31 represent monostable multivibrators model-SN74123. As shown in the Figure, the output terminal Q of the monostable multivibrator 30 is connected to the input terminal A of the monostable multivibrator 31 and the output terminal Q of the monostable multivibrator 31 is connected to the input terminal A of the monostable multivibrator 30. The clear terminals C of both monostable multivibrators 30 and 31 are connected to an input terminal 32. When a "0" input is not applied to the clear terminals C via the input terminal 32, this video clock pulse generator 17 oscillates at a frequency determined by pairs of capacitive and resistive elements 34, 35 and 36, 37 attached externally to the monostable multivibrators, and the resulting oscillations are derived from the output terminal 33. When a "0" input is applied to the clear terminals C via the input terminal 32, the aforementioned oscillation is curtailed. At a prescribed time after the generator disabling signal "0" is removed, the video clock pulse generator 17 resumes oscillation. The time between the termination of the generator disabling signal and the resumption of oscillation is only a few ns (nanoseconds) so that it is possible to obtain approximately in-phase oscillation following each termination of the generator disabling signal.

The video clock pulse generator 17 functions in the system according to the present invention in the manner that will now be described. When the laser beam deflected by the rotating mirror 3 is on the path 13a, it is reflected by the fixed mirror 14 to pass through the diffusion plate 15 and fall incident on the photoelectric element 16. At this time, the signal produced by the photoelectric element 16 and sent to the video clock pulse generator 17 is the aforementioned generator disabling signal "0". As the laser beam is deflected upwardly in FIG. 1 by the rotation of the rotating multiface mirror 3, it eventually rises over the upper edge of the mirror so that no light is received by the light detector and from this instant the light detector ceases producing the generator disabling signal. Thus the generator disabling signal is no longer applied to the input terminal 32 of the video clock pulse generator 17 and after the lapse of a few ns the video clock pulse generator commences oscillation thus producing an output signal (video clock pulses) at the output terminal 33. These video clock pulses are sent to the character generator 9 via the shaping circuit 18 and the AND circuit 21. The character generator 9 produces signals under the synchronizing control of the video clock pulses.

If the scanning time corresponding to a single dot is, as presumed earlier, on the order of 0.37 μs (370ns), then any variation which may be present in the period of a few ns preceding the commencement of oscillation will be so small relative to the period of 370ns as to be negligible. Therefore, the use of the video clock pulses from this generator to control the production of character signals will introduce virtually no jitter into the scanning operation. Furthermore, even if the rotating multi-face mirror should have angular imprecisions or the motor should rotate non-uniformly, the image will still be recorded totally free from jitter.

Figure 3:
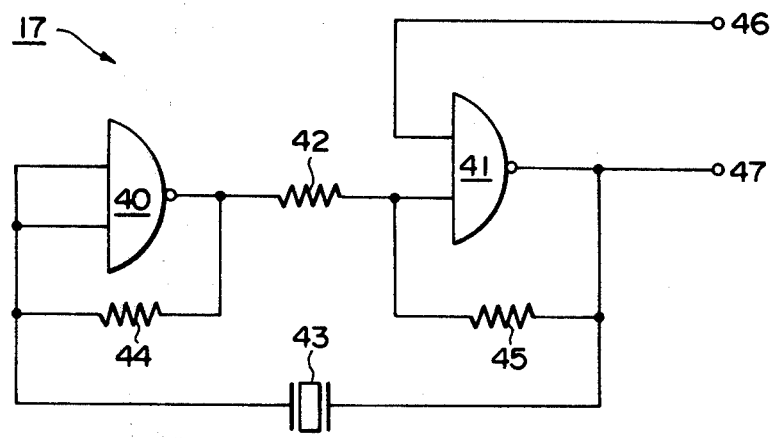

FIG. 3 is a schematic view of another circuit which can be used for the video clock pulse generator 17 in the present invention. The output terminal of a NAND circuit 40 is connected to one of the input terminals of a NAND circuit 41 via a resistor 42. A quartz oscillator 43 is connected between the output terminal of the NAND circuit 41 and the input terminals of the NAND circuit 40. The input and output terminals of each NAND circuit are connected through a resistor 44 or 45 as shown in the drawing. When the signal applied to the other input terminal 46 (the input terminal of the video clock pulse generator) of the NAND circuit 41 is "1", this video clock pulse generator oscillates and when the signal applied thereto is "0", the oscillation ceases. The oscillation frequency is determined by the characteristic frequency of the quartz oscillator 43 and is extremely stable against temperature and humidity variations. The video clock pulse generator of the above described construction can be used in the same manner as that shown in FIG. 2. That is to say, the video clock pulse generator is disabled by the signal sent from the photoelectric element 16 via the amplifier 19 to its input terminal 46 when the deflected laser beam is reflected by the fixed mirror 14 but is permitted to commence oscillation immediately after the laser beam passes above the mirror 14 thus causing the disabling signal to be removed. The signal obtained at the output terminal 47 (the output terminal of the video clock pulse generator) is used to control the character generator 9.

Video clock pulse generators which can be used in the system according to this invention are not limited to the two types described hereinbefore. Any type of video clock pulse generator is usable insofar as it is capable of discontinuing oscillation on receipt of disabling signal indicating that the light detector detects the passage of the light beam and then capable of resuming oscillation upon the lapse of a certain fixed period of time after the termination of the disabling signal and all such video clock generators fall within the concept of this invention.

In accordance with the system of this invention, the beginning points of the scanning lines are brought into highly accurate alignment and the end points are determined by the counter 22 counting up to a predetermined number of video clock pulses. In this system it is theoretically possible for a given scanning line to become misaligned as a result of variations in the speed of rotation of the rotating multiface mirror. This theoretical possibility need not be considered in practical application, however, since the rotating multi-face mirror is rotated at several thousand rpm so that its inertia reduces speed fluctuations to a negligible level.

The system according to the present invention thus affords a way for precluding jitter in the direction of scanning in a laser scanning device employing a rotating multi-face mirror without need for improving the manufacturing precision of the rotating mirror or for using an complex and expensive control circuit for reducing fluctuations in the rotational speed of the driving motor.

I claim:

1. A light beam scanning system in which scanning lines are formed by deflecting a beam of light with a rotating multi-face mirror, said system comprising light detecting means within the field of the deflected light at a position corresponding to a position in the vicinity of the beginning point of said scanning lines for detecting the light beam deflected by each face of said rotating multi-face mirror and for producing a generator disabling signal during the period that said light beam is detected, and means for generating video clock pulses, said means being disabled in response to said disabling signal and being enabled upon the lapse of a time the length of which is fixed within a small degree of tolerance after the termination of said disabling signal.

2. A light beam scanning system in which scanning lines are formed on a light sensitive material by deflecting a light beam with a rotating multi-face mirror, said system comprising an electronic circuit composed of a video clock pulse generator and a character generator controlled by said video clock pulse generator for modulating said light beam in accordance with data for a data source, light detecting means, positioned within the field of the deflected light at a position corresponding to a position in the vicinity of said scanning lines, for detecting the light beam deflected by each face of said rotating multi-face mirror thereby causing said light detecting means to produce a video clock pulse generator disabling signal during the period that said light beam is incident on said light detecting means, means for applying said video clock pulse generator disabling signal to said video clock pulse generator to prevent the generation of video clock pulses during said period, means for freeing said video clock pulse generator to commence the generation of video clock pulses upon the lapse of a time the length of which is fixed within a small degree of tolerance after the end of said period, and counting means responsive to said disabling signal for counting the number of video clock pulses input to said character generator and to block the input of further video clock pulses when a predetermined number has been counted, whereby the scanning lines are maintained in nearly perfect alignment.

3. A light beam scanning system as defined in claim 2 wherein said light beam is a laser beam.

4. A light beam scanning system as defined in claim 2 wherein the frequency of oscillation of said generator used to produce said video clock pulses is greater than 10MHZ.

5. A light beam scanning system as defined in claim 2 wherein said video clock pulse generator comprises two monostable multi-vibrators.

6. A light beam scanning system as defined in claim 2 wherein said video clock pulses generator comprises a quartz oscillator and two NAND circuits.

7. A light beam scanning system as defined in claim 2 wherein said light detecting means comprises a mirror fixed within the field of the deflected light, a light diffusion plate and a photo-electric element.

8. A light beam scanning system as defined in claim 2 wherein said time the length of which is fixed within a small degree of tolerance is on the order of a few nanoseconds.

* * * * *